(12) United States Patent
Kim et al.

(10) Patent No.: US 12,224,436 B2
(45) Date of Patent: Feb. 11, 2025

(54) CATHODE ACTIVE MATERIAL FOR LITHIUM SECONDARY BATTERY AND LITHIUM SECONDARY BATTERY INCLUDING SAME

(71) Applicant: Samsung SDI Co., Ltd., Yongin-si (KR)

(72) Inventors: Jongmin Kim, Yongin-si (KR); Soohyeon Kim, Yongin-si (KR); Jinhwa Kim, Yongin-si (KR); Pilsang Yun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 535 days.

(21) Appl. No.: 16/962,635

(22) PCT Filed: Jan. 29, 2019

(86) PCT No.: PCT/KR2019/001201
§ 371 (c)(1),
(2) Date: Jul. 16, 2020

(87) PCT Pub. No.: WO2019/147098
PCT Pub. Date: Aug. 1, 2019

(65) Prior Publication Data
US 2020/0350582 A1    Nov. 5, 2020

(30) Foreign Application Priority Data

Jan. 29, 2018   (KR) .................. 10-2018-0010990

(51) Int. Cl.
*H01M 4/525*    (2010.01)
*H01M 4/505*    (2010.01)
(Continued)

(52) U.S. Cl.
CPC ........... *H01M 4/525* (2013.01); *H01M 4/505* (2013.01); *H01M 10/0525* (2013.01); *H01M 2004/021* (2013.01)

(58) Field of Classification Search
CPC .. H01M 4/525; H01M 4/505; H01M 10/0525; H01M 2004/021; H01M 4/131; H01M 4/523; H01M 4/00
See application file for complete search history.

(56) References Cited

U.S. PATENT DOCUMENTS 6,261,720 B1 * 7/2001 Kimiya ............... H01M 4/52
                                        429/223
6,291,101 B1 * 9/2001 Kita .................. H01M 4/133
                                        429/231.1
(Continued)

FOREIGN PATENT DOCUMENTS

CN      107644982 A      1/2018
CN      110050366 A      7/2019
(Continued)

OTHER PUBLICATIONS

Zhou, Y. N., Xue, M. Z., & Fu, Z. W. (2013). Nanostructured thin film electrodes for lithium storage and all-solid-state thin-film lithium batteries. Journal of Power Sources, 234, 310-332. (Year: 2013).*

(Continued)

*Primary Examiner* — Nicholas P D'Aniello
*Assistant Examiner* — Albert Michael Hilton
(74) *Attorney, Agent, or Firm* — Lewis Roca Rothgerber Christie LLP

(57) ABSTRACT

Disclosed are a cathode active material for a lithium secondary battery and a lithium secondary battery including the same. The cathode active material includes a secondary particle in which a plurality of primary particles are agglomerated, wherein the secondary particle has a predetermined (Continued)

arrangement structure in which (003) surface of primary particles are aligned to be in a vertical direction with respect to a tangent line at a point (P) at which the (003) surface of the primary particles meet a surface of the secondary particle.

15 Claims, 4 Drawing Sheets

(51) Int. Cl.
*H01M 10/0525* (2010.01)
*H01M 4/02* (2006.01)

(56) References Cited

U.S. PATENT DOCUMENTS

| | | |
|---|---|---|
| 2009/0029253 A1 | 1/2009 | Itou et al. |
| 2010/0119945 A1 | 5/2010 | Akagi et al. |
| 2014/0158932 A1* | 6/2014 | Sun .............. H01M 4/139 252/182.1 |
| 2015/0093580 A1 | 4/2015 | Kobayashi et al. |
| 2015/0147653 A1 | 5/2015 | Nomura et al. |
| 2016/0036041 A1* | 2/2016 | Uwai .............. C01G 53/50 429/231.1 |
| 2016/0164094 A1 | 6/2016 | Takei et al. |
| 2017/0098823 A1* | 4/2017 | Yushin .............. H01M 4/582 |
| 2017/0222221 A1 | 8/2017 | Park et al. |
| 2018/0026267 A1 | 1/2018 | Kim et al. |
| 2018/0026268 A1 | 1/2018 | Kim et al. |
| 2018/0108940 A1 | 4/2018 | Kwon et al. |
| 2018/0151876 A1 | 5/2018 | Kim et al. |
| 2018/0159128 A1 | 6/2018 | Kim et al. |
| 2018/0166687 A1 | 6/2018 | Chang et al. |
| 2020/0083530 A1 | 3/2020 | Yun et al. |

FOREIGN PATENT DOCUMENTS

| | | | |
|---|---|---|---|
| JP | 5415012 B2 | 2/2014 | |
| JP | 2015-76397 A | 4/2015 | |
| JP | 2018-14325 A | 1/2018 | |
| JP | 2018-14326 A | 1/2018 | |
| KR | 10-2010-0099337 A | 9/2010 | |
| KR | 10-2015-0059594 A | 6/2015 | |
| KR | 10-2016-0049995 A | 5/2016 | |
| KR | 10-2016-0069992 A | 6/2016 | |
| KR | 10-2016-0129764 A | 11/2016 | |
| KR | 10-2018-0010122 A | 1/2018 | |
| KR | 10-2018-0010123 A | 1/2018 | |
| KR | 10-2018-0062429 A | 6/2018 | |
| KR | 10-2018-0063849 A | 6/2018 | |
| KR | 10-2018-0063858 A | 6/2018 | |
| KR | 10-2018-0065944 A | 6/2018 | |
| WO | WO-2016068594 A1 * | 5/2016 | ............ C01G 53/42 |

OTHER PUBLICATIONS

Korean Office Action dated Mar. 26, 2022, issued in Korean Patent Application No. 10- 2020-7025019 (6 pages).
Chinese Office Action, with English translation, dated Oct. 8, 2022, issued in corresponding Chinese Patent Application No. 201980010098.X (13 pages).
Chinese Office action for Application No. 201980010098.X., dated Apr. 3, 2023, 12 pages.

* cited by examiner

CATHODE ACTIVE MATERIAL FOR LITHIUM SECONDARY BATTERY AND LITHIUM SECONDARY BATTERY INCLUDING SAME

CROSS-REFERENCE TO RELATED APPLICATION(S)

This application is a National Phase Patent Application of International Patent Application Number PCT/KR2019/001201, filed on Jan. 29, 2019, which claims priority of Korean Patent Application No. 10-2018-0010990, filed Jan. 29, 2018. The entire contents of both of which are incorporated herein by reference.

TECHNICAL FIELD

A cathode active material for a lithium secondary battery and a lithium secondary battery including the same are related.

BACKGROUND ART

As portable electronic devices, communication devices, and the like are developed, there are needs for development of a lithium secondary battery having a high energy density.

This lithium secondary battery includes a cathode and an anode which include an electrode active material layer including an electrode active material formed on an electrode current collector. The cathode active material is mostly an intercalation material of lithium ions, and may be oxides such as lithium cobalt oxide ($Li_xCoO_2$), lithium nickel oxide ($Li_xNiO_2$), lithium nickel cobalt oxide ($Li_x(NiCo)O_2$), lithium nickel cobalt manganese oxide ($Li_x(NiCoMn)O_2$), spinel-type lithium manganese oxide ($Li_xMn_2O_4$), manganese dioxide ($MnO_2$), or olivine-type or NASICON-type phosphates such as lithium iron phosphate ($Li_xFePO_4$), lithium manganese phosphate ($Li_xMnPO_4$), and the like, silicates, polymer materials, and the like.

The anode active material may be a compound capable of intercalating lithium metal, its alloy or lithium ion, and may be a polymer material or a carbon material, for example a graphite-based material such as artificial or natural graphite, and the like, non-graphitizable carbon, or graphitizable carbon, carbon nanotube (CNT), a carbon nanofiber (CNF), a carbon nanowall (CNW), and the like.

DISCLOSURE

Technical Problem

An embodiment provides a cathode active material for a lithium secondary battery having improved lithium diffusivity during charge and discharge and relieving stress due to volume change, thereby improving charge and discharge capacity, efficiency, and cycle-life characteristics.

Another embodiment provides a lithium secondary battery including the cathode active material for a lithium secondary battery.

Technical Solution

According to an embodiment, a cathode active material for a lithium secondary battery includes a secondary particle in which a plurality of primary particles are agglomerated, wherein the secondary particle has a predetermined arrangement structure in which (003) surface of primary particles are aligned to be in a vertical direction with respect to a tangent line at a point (P) at which the (003) surface of the primary particles meet a surface of the secondary particle.

About 50% or more of the primary particles may be arranged to be in a vertical direction with respect to the tangent line at the point (P) at which the (003) surface meets the surface of the secondary particle.

An average length of the primary particles in a c-axis direction may be in the range of 100 nm to 200 nm.

A ratio of the length of the long side and the short side of the plane perpendicular to the (003) surface of the primary particle may be in a range of 2:1 to 10:1

The secondary particle may have a radial array structure having one center or a multi-core radial array structure having a plurality of centers.

A pore volume fraction of micropores of less than or equal to 10 nm of the secondary particle may be greater than or equal to 10% of a total pore volume.

The secondary particle may have a pore size that decreases sequentially from the core to the surface portion.

The secondary particles may have porosity that decreases sequentially from the core to the surface portion.

According to another embodiment, a lithium secondary battery including the aforementioned cathode, an anode, and an electrolyte therebetween is provided.

Advantageous Effects

The cathode active material for a lithium secondary battery according to an embodiment may have improved lithium diffusivity during charge and discharge and relieving stress due to volume change, thereby providing lithium secondary battery having improved charge and discharge capacity, efficiency, and cycle-life characteristics.

MODE FOR INVENTION

Figure 1:
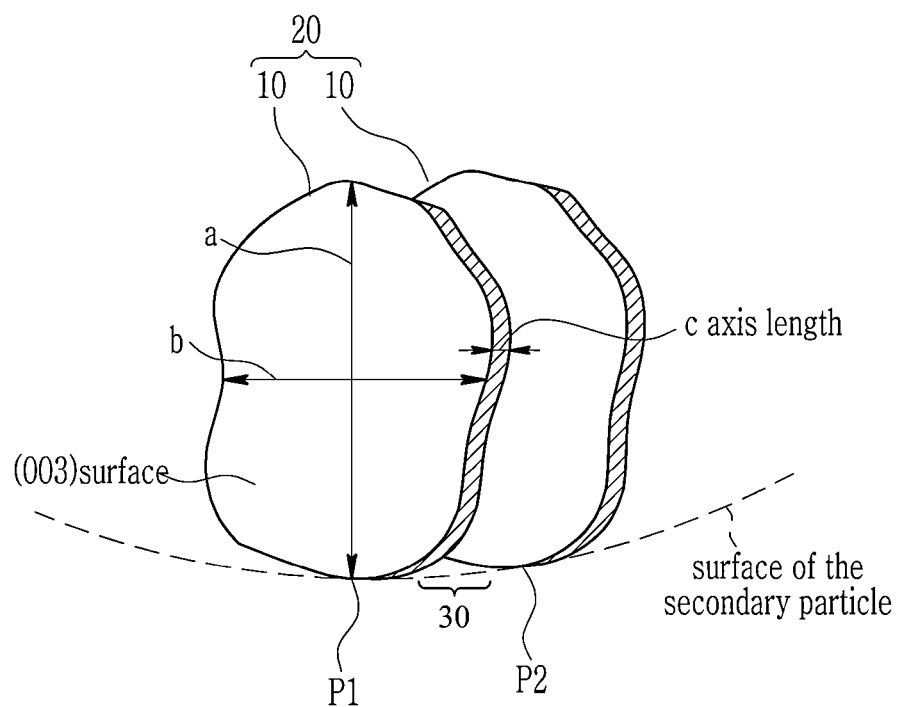
FIG. 1 is a schematic view showing arranged primary particles constituting a cathode active material for a lithium secondary battery according to an embodiment.

Hereinafter, embodiments will be described in detail so that those skilled in the art can easily implement them. However, embodiments may be embodied in many different forms and is not construed as limited to the embodiments set forth herein.

In the drawings, the thickness of layers, films, panels, regions, etc., are exaggerated for clarity.

According to an embodiment, a cathode active material for a lithium secondary battery includes a secondary particle in which a plurality of primary particles are agglomerated, wherein the secondary particle has a predetermined arrangement structure in which (003) surface of primary particles are aligned to be in a vertical direction with respect to a tangent line at a point (P) at which the (003) surface of the primary particles meet a surface of the secondary particle.

Hereinafter, the cathode active material for a lithium secondary battery is described with reference to FIG. 1.

FIG. 1 is a schematic view showing arranged primary particles constituting a cathode active material for a lithium secondary battery according to an embodiment.

FIG. 1 shows only secondary particles composed of two primary particles, but it is obvious that three or more primary particles may be agglomerated to form secondary particles. Referring to FIG. 1, the (003) surface of the primary particles 10 are aligned in a vertical direction with tangent lines at points (P1 and P2) at which the (003) surface of the primary particles 10 meet the surface of the secondary particle.

Herein, the surface of the secondary particle indicates a spherical surface formed by connecting points at which long axis (a axis) or short axis (b axis) of the neighboring primary particles meets edges of these primary particles. In addition, the vertical direction means that the tangent lines at the points (P1 and P2) where the long axis (a axis) or short axis (b axis) of the (003) surface meet the surface of the secondary particle are crossed each other with 90°±20°, for example, 90°±10°.

50% or more, for example 60% or more or 70% or more of the primary particles 10 may be arranged to be in a vertical direction with respect to the tangent line at the point (P) at which the (003) surface meets the surface of the secondary particle.

The primary particles 10 may have a plate shape and a shorter thickness direction length (c axis) than the plane direction length (long axis (a axis) or short axis (b axis) length). The (003) surface of the primary particles 10 may have rectangular, oval, hexagonal sheet, or amorphous shape in which the long axis (a axis) or short axis (b axis) have a different length from each other or a circular or square shape in which the long axis (a axis) and the short axis (b axis) have the same length as each other, but the present disclosure is not limited thereto.

The plane direction (long axis (a axis) or short axis (b axis)) length may have an average length ranging from 150 nm to 500 nm, for example, 200 nm to 380 nm, specifically, 290 nm to 360 nm. The average length of the plane direction is an average length of the long axis length and the short axis length.

The thickness direction lengths (c axis direction length) of the primary particles 10 may be in a range of 100 nm to 200 nm, for example, 120 nm to 180 nm, specifically, 130 nm to 150 nm. In this way, since the primary particles 10 has a small thickness, less cracks may be generated during the contraction/expansion, and accordingly, cycle-life characteristics are improved, but resistance is less increased.

A vertical plane with the (003) surface of the primary particles 10 may have short/long side ratio in a range of 1:2 to 1:10, for example, 1:2.1 to 1:5, and specifically, 1:2.3 to 1:2.9.

The primary particles 10 aligned as above are agglomerated and thus form a secondary particle 20. For example, a plurality of the primary particles 10 is agglomerated one another and thus provides the secondary particle 20 having a radial array structure, as shown in FIG. 1.

The secondary particle 20 may have a particle size of 2 μm to 20 μm, for example, 8 μm to 15 μm, and specifically, about 12 μm. Herein, the particle size indicates an average diameter when the secondary particles 20 have a spherical shape. When the secondary particles 20 are oval, bar-shaped, amorphous, and the like, the particle size indicates a long axis length.

When the (003) surface of the primary particles 10 are arranged to be in a vertical direction with respect to the tangent line at the points P1 and P2 at which the (003) surface meets the surface of the secondary particle, a relatively large number of lithium diffusion passages between boundaries are formed on the surface portion of the secondary particle 20 and a lithium diffusivity may be increased by exposing a large amount of the crystal surface capable of transferring lithium, thereby securing high initial efficiency and capacity. In addition, it is possible to suppress a stress caused by volume changes of the secondary particles 20 during charge and discharge to suppress the occurrence of cracks.

In the present specification, a region including an intermediate layer and a shell is called to be a "surface portion," that is, a region of 30 length % to 50 length %, for example, 40 length % out of a total length region from the center of the secondary particle 20 to the outermost. For example, the "surface portion" may indicate a region within 3 μm from the outermost of the secondary particle 20. In addition, the "shell" may be a region of 5 length % to 15 length %, for example, 10 length % from the outmost of the secondary particle 20 out of the total length region from the center of the secondary particle 20 to the outermost. Furthermore, the "core (center portion)" indicates a region of 50 length % to 70 length %, for example, 60 length % from the center of the secondary particle 20 out of the total length region from the center of the secondary particle 20 to the outermost. An "intermediate layer" refers to a remaining region except for the core and the shell. As used herein, an arrangement of primary particles 10 may be present on the surface portion of the secondary particle 20.

In addition, when the primary particles 10 are aligned with the surface-contact one another, as shown in FIG. 1, pores formed among the primary particles 10 are present on the surface portion of the secondary particle 20 and thus promote lithium diffusion from the surface.

The plurality of primary particles 10 may be aligned toward one center with the surface-contact along the c axis (thickness) directions of the primary particles 10 and thus provide the secondary particle 20 having a radial array structure. In another embodiment, the secondary particle 20 may have a multi-core radial array structure having a plurality of centers.

In this way, when the secondary particle 20 has one center or the multi-core radial array structure as described above, lithium may be easily intercalated/deintercalated deep down to the core (the center portion) of the secondary particle 20.

In an embodiment, the secondary particle 20 may have 10% of a pore volume fraction of micropores 30 having a size of less than or equal to 10 nm out of a total pore volume. Herein, the pore volume fraction may be measured in a BJH desorption method. The micropores 30 of less than or equal to 10 nm may be present in the surface portion of the secondary particle 20. The primary particles 10 arranged with the surface-contact bring about uniform contraction and expansion during the lithium intercalation/deintercalation, and the micropores are present in the surface portion of the secondary particle 20, toward which the primary particles 10 expand during the lithium deintercalation, and thus work as a buffer.

In addition, the secondary particle 20 may have a sequentially-decreasing pore size from the core (center portion) to the surface portion. In other words, in the core of the secondary particle 20, a pore having a larger size than in the surface portion may be formed. Herein, there may be an effect of shortening a diffusion distance of lithium ions down to the core. A pore size of the core of the secondary particle 20 may be in a range of 150 nm to 1 μm, for example, 150 nm to 550 nm, and a pore size of the surface portion may be in a range of less than 150 nm, for example, less than or equal to 120 nm. Herein, the "pore size" indicates an average diameter, when the pores have a spherical or circular shape. When the pores are oval and the like, the pore size indicates a long axis length. The secondary particle 20 includes a plenty of micropores having a several nm size among the primary particles in the surface portion, and these micropores maximize lithium movement from the electrolyte solution to the cathode active material. The cathode active material may have overall porosity of 1% to 8%, for example, 1.5% to 7.3%. In the cathode active material, the surface portion may have smaller porosity than that of the core.

The porosity of the secondary particle 20 may sequentially decrease from the core to the surface portion. The porosity of the core may be 2% to 20%, for example, 3.3% to 16.5%, and the porosity of the surface portion may be in a range of 0.3% to 0.7%. In the present specification, the porosity is used as the same as the pore volume fraction and obtained as a ratio of a pore area relative to a total area.

The cathode active material may be a compound represented by Chemical Formula 1.

$$Li_a(Ni_{1-x-y-z}Co_xMn_yM_z)O_2 \quad \text{[Chemical Formula 1]}$$

In Chemical Formula 1,

M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $0.95 \leq a \leq 1.3$, $x \leq (1-x-y-z)$, $y \leq (1-x-y-z)$, $0 < x < 1$, $0 \leq y < 1$, and $0 \leq z < 1$.

In Chemical Formula 1, $0.95 \leq a \leq 1.3$, for example $1.0 \leq a \leq 1.1$, $0 < x \leq 0.33$, for example $0.1 \leq a \leq 0.33$, and $0 \leq y \leq 0.5$, for example $0.05 \leq y \leq 0.3$, $0 \leq z \leq 0.05$, and $0.33 \leq (1-x-y-z) \leq 0.95$. For example, in Chemical Formula 1, $0.33 \leq (1-x-y-z) \leq 0.95$.

According to another embodiment, in Chemical Formula 1, $0 \leq z \leq 0.05$, $0 < x \leq 0.33$, and $0 \leq y \leq 0.33$.

According to an embodiment, z in Chemical Formula 1 may be 0.

According to another embodiment, in Chemical Formula 1, when z is in the range of $0 < z \leq 0.05$, M may be aluminum.

For example, the cathode active material may be $LiNi_{0.6}Co_{0.2}Mn_{0.2}O_2$, $LiNi_{0.5}Co_{0.2}Mn_{0.3}O_2$, $LiNi_{0.33}Co_{0.33}Mn_{0.33}O_2$, $LiNi_{0.8}Co_{0.1}Mn_{0.1}O_2$, or $LiNi_{0.85}Co_{0.1}Al_{0.05}O_2$.

The cathode active material may be prepared by heat-treating a mixture obtained by mixing a lithium precursor and a metal hydroxide precursor at a predetermined mole ratio under an oxidizing gas atmosphere.

The lithium precursor may be for example lithium hydroxide, lithium fluoride, lithium carbonate, or a mixture thereof.

The metal hydroxide precursor includes a core, an intermediate layer, and a shell which have different porosity one another, and the porosity sequentially decreases from the core to the shell, and the intermediate layer and the shell may have a structure of radially arranged plate-shaped primary particles.

The metal hydroxide precursor may be $Me(OH)_2$ (Me includes nickel, cobalt, manganese, and M of Chemical Formula 1).

In an embodiment, the metal hydroxide precursor may be a compound represented by Chemical Formula 2.

$$(Ni_{1-x-y-z}Co_xMn_yM_z)(OH)_2 \quad \text{[Chemical Formula 2]}$$

In Chemical Formula 2, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $x \leq (1-x-y-z)$, $y \leq (1-x-y-z)$, $0 < x < 1$, $0 \leq y < 1$, and $0 \leq z < 1$.

In Chemical Formula 2, $0 < x \leq 0.33$, $0 \leq y \leq 0.5$, $0 \leq z \leq 0.05$, and $0.33 \leq (1-x-y-z) \leq 0.95$.

In Chemical Formula 2, $0.5 \leq (1-x-y-z) \leq 0.95$.

The metal hydroxide precursor of Chemical Formula 2 may be, for example, $Ni_{0.6}Co_{0.2}Mn_{0.2}(OH)_2$, $Ni_{0.5}Co_{0.2}Mn_{0.3}(OH)_2$, $Ni_{0.33}Co_{0.33}Mn_{0.33}(OH)_2$, or $Ni_{0.8}Co_{0.1}Mn_{0.1}(OH)_2$.

The metal hydroxide precursor may be prepared by reacting a complex agent, a pH controlling agent, and metal raw materials for the metal hydroxide precursor to form a core of a nickel-based active material precursor; forming an intermediate layer on the core; and forming a surface portion on the intermediate layer.

The process of forming the core, the intermediate layer, and the surface portion may be performed by changing process conditions such as concentration and input of the metal raw materials, concentration and input of ammonia water as the complex agent, and input of the pH controlling agent, and the like.

First, the core forming process is as follows.

The complex agent and the pH controlling agent are put in a reactor, and the metal raw materials are added thereto and reacted. When pH of the reaction mixture in the reactor is changed as the reaction proceeds, the pH controlling agent may be further added thereto to control pH. Specifically, the complex agent may have a concentration of 0.1 M to 0.7 M, for example, 0.2 M to 0.5 M. The metal raw materials may have concentrations of 0.1 M to 0.5 M, for example, 0.3 M. The input amounts of the metal raw materials may be in a range of 50 m l/min to 100 ml/min.

The intermediate layer-forming process on the core is as follows.

The metal raw materials and the complex agent are added to a resulting material from the core-forming process, and after controlling pH of the reaction mixture, a reaction is performed. Particularly, in the intermediate layer-forming process, and in order to prevent a particle growth rate decrease after reacting the resulting material from the core-forming process for predetermined time, inputs and concentrations of the metal raw materials and the complex agent are increased. Specifically, the concentration of the complex agent may be for example in a range of 0.3 M to 1.0 M, and the input of the complex agent may be in a range of 8 ml/min to 12 ml/min, and the input of the metal raw materials may be in a range of 90 ml/min to 120 ml/min.

The shell-forming process on the intermediate layer is as follows.

After reacting the obtained reaction product from the intermediate layer-forming process for predetermined time, in order to prevent the particle growth rate decrease, inputs and concentrations of the metal raw materials and the complex agent are increased. Specifically, the concentration of the complex agent may be in a range of 0.35 M to 1.0 M, the input of the complex agent may be in a range of 12 ml/min to 18 ml/min, and the input of the metal raw materials may be in a range of 120 ml/min to 150 ml/min. On the other hand, the reaction condition of the shell-forming process has an influence on a surface depth of a porous layer in the metal hydroxide precursor.

The core, intermediate layer, and shell-forming processes have the following commons.

In each process, stirring power is in a range of 0.1 kW/m$^2$ to 6 kW/m$^2$, for example, 1 kW/m$^2$ to 3 kW/m$^2$. The stirring powers in the intermediate layer and shell-forming processes may be reduced compared with that of the core forming process, but the stirring powders of the intermediate and shell-forming processes may be the same.

The pH of the reaction mixture may be adjusted in a range of 10 to 12. Particularly, the pH controlling agent may control the pH of the reaction mixture to form a precipitate from the reaction mixture, for example sodium hydroxide (NaOH), sodium carbonate ($Na_2CO_3$), sodium oxalate ($Na_2C_2O_4$), and the like, and the sodium hydroxide (NaOH) may be desirably used.

The concentration of the complex agent is sequentially increased in order of the core, intermediate layer, and shell-forming processes and may be, for example, in a range of 0.1 M to 0.7 M. Particularly, a complex agent plays a role in controlling a reaction rate of formation of a precipitate in a co-precipitation reaction, and may be ammonia water and citric acid and in an embodiment, may be desirably ammonia water. On the other hand, an amount of the complex agent is used at a general level. The metal hydroxide precursor obtained by the above process is mixed with a lithium precursor. A mixing ratio of the metal hydroxide precursor and the lithium precursor is stoichiometrically controlled to produce the cathode active material of Chemical Formula 1.

The mixing may be dry mixing or may be performed using a mixer or the like.

The dry mixing may be performed using milling. When the milling is performed so that the metal hydroxide precursor used as the starting material is hardly deformed such as pulverization. For this purpose, it is necessary to control a size of the lithium precursor mixed with the metal hydroxide precursor in advance. The lithium precursor may have a size (average particle diameter) of 5 μm to 20 μm, for example 10 μm. When the lithium precursor having such a size is milled with a metal hydroxide precursor at 300 rpm to 3,000 rpm, the desired nickel-based active material intermediate may be obtained.

When the internal temperature of the mixer is increased above 30° C. during the above milling process, the internal temperature of the mixer may be cooled to maintain it at room temperature, 25° C.

The heat treatment is performed under an oxidizing gas atmosphere. The oxidizing gas atmosphere includes an oxidizing gas such as oxygen or air, and for example, the oxidizing gas may be composed of 10 volume % to 20 volume % of oxygen or air and 80 volume % to 90 volume % of inert gas.

The heat treatment process may be for example performed at 600° C. to 800° C., specifically 650° C. to 800° C. In the heat treatment, a temperature-increasing rate may be 1° C./min to 5° C./min, for example, 3° C./min. The heat treatment time may be changed depending on the heat treatment temperature and the like, for example, in a range of 3 hours to 10 hours.

An embodiment provides a lithium secondary battery including the cathode active material. The lithium secondary battery includes a cathode including the cathode active material, an anode, an electrolyte, and a separator.

The cathode and anode are formed by applying each of a composition for forming a cathode active material layer and a composition for forming an anode active material layer on a current collector, and drying the composition.

The composition forming the cathode active material layer is formed by mixing a cathode active material, a conductive agent, a binder, and a solvent, and the cathode active material is as described above.

The binder is a component that assists in binding of the active material to the conductive agent and to the current collector and the binder is added in an amount of 1 to 50 parts by weight based on a total weight of 100 parts by weight of the cathode active material. Non-limiting examples of the binder may be polyvinylidene fluoride, polyvinyl alcohol, carboxylmethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), sulfonated EPDM, a styrene butadiene rubber, a fluoro rubber, or various copolymers. An amount of the binder may be 0.5 to 5 parts by weight, for example 1 to 5 parts by weight or 2 to 5 parts by weight based on a total weight, 100 parts by weight of the cathode active material. When the amount of the binder is in the above range, a binding force of the active material layer to the current collector is improved.

The conductive agent may be not particularly limited as long as it has electron conductivity without causing chemical changes in a battery and may be, for example graphite such as natural graphite or artificial graphite; a carbon-based material such as carbon black, acetylene black, ketjen black, channel black, furnace black, lamp black, thermal black and the like; a conductive fiber such as a carbon fiber or a metal fiber; carbon fluoride; a metal powder such as aluminum or a nickel powder; a conductive whisker such as zinc oxide, or potassium titanate; a conductive metal oxide such as titanium oxide; a conductive material such as a polyphenylene derivative.

The conductive agent is added in an amount of 0.5 to 5 parts by weight, for example 1 to 5 parts by weight or 2 to 5 parts by weight based on a total weight, 100 parts by weight of the cathode active material. When the amount of the conductive agent is in the range, conductivity characteristics of the finally obtained electrode are improved.

Non-limiting examples of the solvent include N-methylpyrrolidone and the like.

An amount of the solvent is 1 to 10 parts by weight based on 100 parts by weight of the cathode active material. When the amount of the solvent is in the range, it is easy to work to form the active material layer.

The cathode current collector is 3 μm to 500 μm thick and is not particularly limited if it has high conductivity without causing chemical changes in the battery, and may be for example, stainless steel, aluminum, nickel, titanium, heat-treated carbon, or aluminum or stainless steel which is surface-treated with carbon, nickel, titanium, silver, and the like. The current collector may form a fine concavo-convex on its surface to enhance an adherence of cathode active materials and may be in various forms such as films, sheets, foils, nets, porous bodies, foams and nonwoven fabric bodies.

Separately, a composition for forming an anode active material layer is prepared by mixing an anode active material, a binder, a conductive agent, and a solvent.

The anode active material is a material capable of intercalating and releasing lithium ions. As non-limiting examples of the anode active material, a carbon-based material such as graphite or carbon, a lithium metal, an alloy thereof, and a silicon oxide-based material may be used. According to an embodiment, silicon oxide may be desirably used. The binder is added in an amount of 0.5 to 50 parts by weight, for example 1 to 50 parts by weight based on a total weight, 100 parts by weight of the anode active material. A non-limiting example of such a binder may be the same type as the cathode.

The conductive agent is added in an amount of less than or equal to 5 parts by weight, for example 1 to 5 parts by weight based on a total weight, 100 parts by weight of the anode active material. When the amount of the conductive agent is in the range, conductivity characteristics of the finally obtained electrode are improved.

An amount of the solvent is 1 to 10 parts by weight based on 100 parts by weight of the anode active material. When the amount of the solvent is in the range, it is easy to work to form the anode active material layer.

The conductive agent and the solvent may use the same species of material as those when manufacturing the cathode.

The anode current collector is 3 μm to 500 μm thick. Such an anode current collector is not particularly limited if it has high conductivity without causing chemical changes in the battery and may be, for example, copper, stainless steel, aluminum, nickel, titanium, heat-treated carbon, copper or stainless steel which is surface-treated with carbon, nickel, titanium, silver, and the like, an aluminum-cadmium alloy, and the like. In addition, the anode current collector may form a fine concavo-convex on its surface to enhance an adherence of anode active materials and may be in various forms such as films, sheets, foils, nets, porous bodies, foams and nonwoven fabric bodies, like the cathode current collector.

A separator is disposed between the cathode and anode according to the procedure.

The separator has a pore diameter of 0.01 μm to 10 μm and a thickness of 5 μm to 300 μm. Specific examples may include polypropylene, polyethylene and the like olefin based polymer; or a sheet made of a glass fiber or a non-woven fabric. When a solid electrolyte such as a polymer is used as the electrolyte, a solid electrolyte may also serve as a separator.

The electrolyte may be a non-aqueous electrolyte including a non-aqueous solvent and a lithium salt, an organic solid electrolyte, an inorganic solid electrolyte, and the like.

The non-aqueous solvent may be for example, a aprotic organic solvent such as N-methyl-2-pyrrolidinone, propylene carbonate, ethylene carbonate, butylene carbonate, dimethyl carbonate, diethyl carbonate, gamma-butyro lactone, 1,2-dimethoxyethane, 2-methyl tetrahydrofuran, dimethylsulfoxide, 1,3-dioxolane, formamide, N,N-dimethyl formamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate, and the like. The lithium salt is a material that is dissolved in the non-aqueous electrolyte and non-limiting examples thereof may be LiCl, LiBr, LiI, LiClO4, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carboxylate, tetraphenyl lithium borate, imide, and the like.

Non-limiting examples of the organic solid electrolyte may be a polyethylene derivative, a polyethylene oxide derivative, a polypropylene oxide derivative, a phosphoric acid ester polymer, polyester sulfide, polyvinyl alcohol, polyvinylidene fluoride, and the like.

Non-limiting examples of the inorganic solid electrolyte may be $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like.

Figure 2:
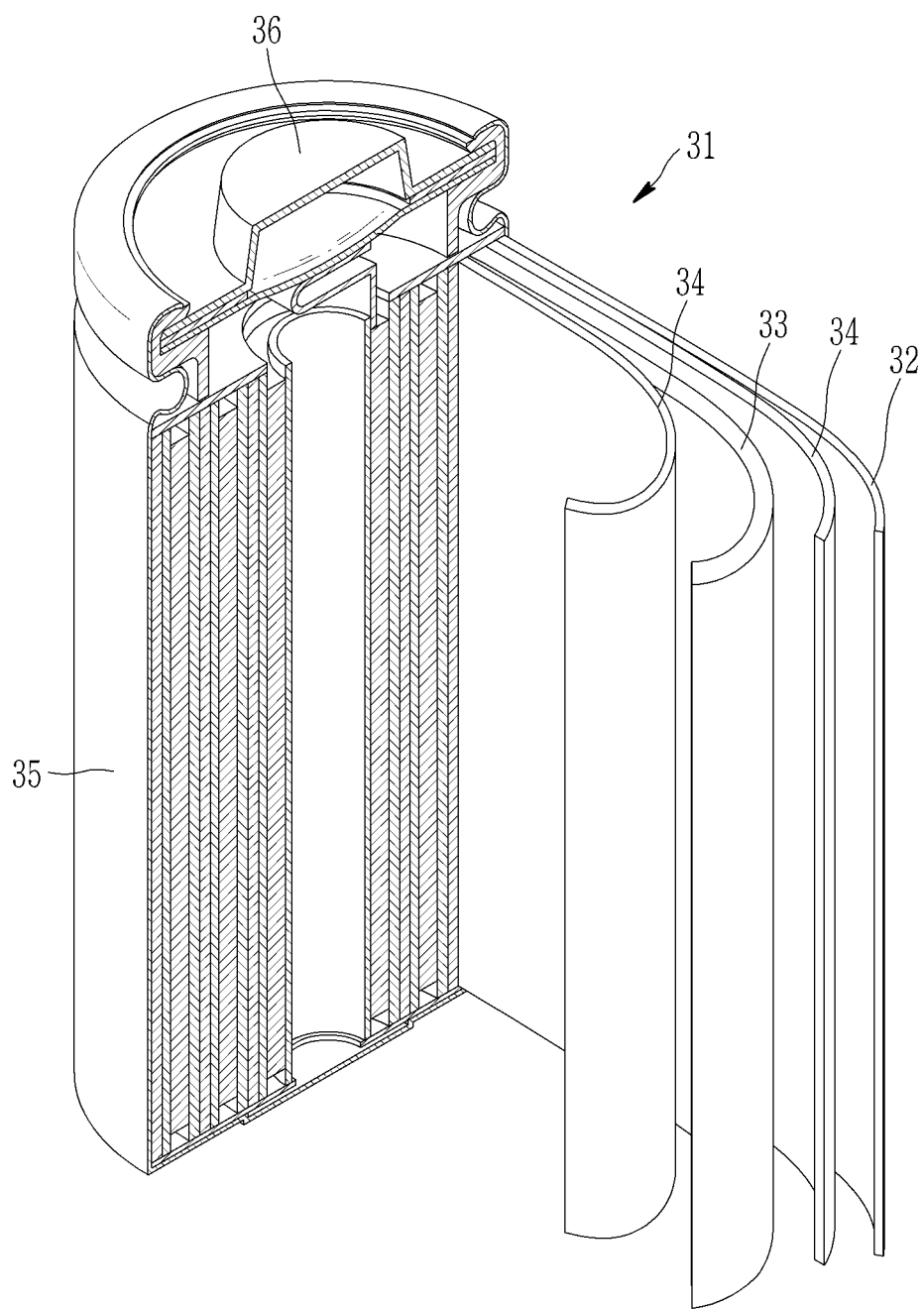
FIG. 2 is a perspective view that schematically shows a representative structure of a lithium secondary battery according to an embodiment.

FIG. 2 is a perspective view that schematically shows a representative structure of a lithium secondary battery according to an embodiment.

Referring to FIG. 2, a lithium secondary battery 31 includes a cathode 33 including a cathode active material according to an embodiment, an anode 32, and a separator 34. The aforementioned cathode 33, anode 32 and separator 34 may be wound or folded and housed in a battery case 35. Then, an organic electrolyte solution is injected and sealed in the battery case 35 with a cap assembly 36 to complete a lithium secondary battery 31. The battery case 35 may be cylindrical, prismatic, thin film-type, and the like. For example, the lithium secondary battery 30 may be a large-sized thin film battery. The lithium secondary battery may be a lithium ion battery. A separator may be disposed between the cathode and the anode and thus form a battery structure. The battery structure is stacked into a bi-cell structure, impregnated in an organic electrolyte solution, and then, housed in a pouch to complete a lithium ion polymer battery. In addition, a plurality of the battery structures is stacked and thus forms a battery pack, and this battery pack may be used for all devices requiring high capacity and high power. For example, it may be used for a laptop, a smart phone, electric vehicle and so on.

In addition, the lithium secondary battery has excellent storage stability, cycle-life characteristics, and high-rate characteristics at high temperatures, and thus may be used in an electric vehicle (EV). For example, it may be used for a hybrid vehicle such as a plug-in hybrid electric vehicle (PHEV).

The present invention is explained in more detail in the following examples and comparative examples. It is to be understood, however, that the examples are for the purpose of illustration and are not to be construed as limiting the present invention.

Preparation Example 1: Preparation of Metal Hydroxide Precursor

In the following preparing process, nickel sulfate, cobalt sulfate, and manganese sulfate were used as metal raw materials for forming metal hydroxide precursors.

[First Step: 1.5 kW/m$^3$, NH$_3$ 0.30 M, pH 10 to 11, and Reaction Time of 6 Hours]

First, ammonia water (NH$_3$) having a concentration of 0.30 M was put in a reactor. While a metal raw materials and a complex agent (ammonia water) were added thereto respectively at 90 ml/min and 10 ml/min at 50° C. under an agitation power of 1.5 kW/m$^3$, a reaction was started. While NaOH was added thereto to maintain pH, the reaction was performed for 6 hours. Core particles obtained as a reaction result had an average size of about 5.5 μm to 6.5 μm and then, a second step was performed as follows.

[Second Step: 1.0 kW/m$^3$, NH$_3$ 0.35 M, pH 10 to 11, and Reaction Time of 6 Hours]

The metal raw materials and the complex agent were added thereto respectively at 100 ml/min and 15 ml/min, while the reaction temperature was maintained at 50° C., so that the complex agent maintained a concentration of 0.35 M. While NaOH was added thereto in order to maintain pH, the reaction was performed for 6 hours. Herein, the reaction was performed by lowering the agitation power by 1.0 kW/m$^3$ than that of the first step. Particles having a core and an intermediate layer produced from this reaction had an average size of 9 µm to 10 µm, and then, a third step was performed as follows.

[Third Step: 1.0 kW/m$^3$, NH$_3$ 0.40 M, pH 10 to 11, and Reaction Time of 4 Hours]

The metal raw and the complex agent were added thereto respectively at 150 ml/min and 20 ml/min, while the reaction temperature was maintained at 50° C., so that the complex agent maintained a concentration of 0.40 M. While NaOH was added thereto in order to maintain pH, the reaction was performed for 4 hours. Herein, the agitation power was maintained equally to that of the second step.

[Post Process]

As for a post process, the resulting material was washed and hot air-dried at about 150° C. for 24 hours to obtain a metal hydroxide precursor (Ni$_{0.6}$Co$_{0.2}$Mn$_{0.2}$OH)$_2$.

Preparation Example 2: Preparation of Metal Hydroxide Precursor

A metal hydroxide precursor (Ni$_{0.5}$Co$_{0.2}$Mn$_{0.3}$(OH)$_2$) was obtained according to the same method as Preparation Example 1 except that the contents of nickel sulfate, cobalt sulfate, and manganese sulfate were changed in order to obtain a metal hydroxide (Ni$_{0.5}$Co$_{0.2}$Mn$_{0.3}$(OH)$_2$) and reacted for 25 hours (the first step: 10 hours, the second step: 10 hours, and the third step: 5 hours).

Preparation Example 3: Preparation of Metal Hydroxide Precursor

A radial metal hydroxide precursor (Ni$_{0.8}$Co$_{0.1}$Mn$_{0.1}$(OH)$_2$) was obtained according to the same method as Preparation Example 1 except that the contents of nickel sulfate, cobalt sulfate, and manganese sulfate were changed and reacted for 25 hours (the first step: 12 hours, the second step: 8 hours, and the third step: 5 hours).

Preparation Example 4: Preparation of Metal Hydroxide Precursor

A metal hydroxide precursor (Ni$_{0.85}$Co$_{0.1}$Al$_{0.05}$(OH)$_2$) was obtained according to the same method as Preparation Example 1 except that nickel sulfate (NiSO$_4$.6H$_2$O), cobalt sulfate (CoSO$_4$.7H$_2$O), and aluminum nitrate (Al(NO$_3$)$_3$.9H$_2$O) were mixed in a mole ratio of 85:10:5 and then, reacted for 18 hours (the first step: 7 hours, the second step: 5 hours, and the third step: 4 hours).

Preparation Example 5: Preparation of Metal Hydroxide Precursor

A metal hydroxide precursor (Ni$_{0.33}$Co$_{0.33}$Mn$_{0.333}$(OH)$_2$) was obtained according to the same method as Preparation Example 1 except that the contents of nickel sulfate, cobalt sulfate, and manganese sulfate were changed and reacted for 28 hours (the first step: 11 hours, the second step: 11 hours, and the third step: 6 hours).

Example 1: Preparation of Cathode Active Material

The metal hydroxide precursor (Ni$_{0.6}$Co$_{0.2}$Mn$_{0.2}$(OH)$_2$) according to Preparation Example 1 and lithium hydroxide (LiOH.H$_2$O) having an average particle diameter of about 15 µm in a mole ratio of 1:1 were dry-mixed at 2,000 rpm with a high speed mixer and then, heat-treated at about 850° C. in a firing furnace for 8 hours under an oxygen atmosphere to synthesize a cathode active material of LiNi$_{0.6}$Co$_{0.2}$Mn$_{0.2}$O$_2$.

Example 2: Preparation of Cathode Active Material

The metal hydroxide precursor (Ni$_{0.6}$Co$_{0.2}$Mn$_{0.2}$(OH)$_2$) according to Preparation Example 1 and lithium hydroxide (LiOHH$_2$O) having an average particle diameter of about 15 µm in a mole ratio of 1:1 were dry-mixed at 2,000 rpm and then, primarily heat-treated at 800° C. in a firing furnace for 6 hours under an oxygen atmosphere and then, secondarily at 830° C. for 6 hours to synthesize a cathode active material of LiNi$_{0.6}$Co$_{0.2}$Mn$_{0.2}$O$_2$.

Example 3: Preparation of Cathode Active Material

A cathode active material of LiNi$_{0.6}$Co$_{0.2}$Mn$_{0.2}$O$_2$ was synthesized according to the same method as Example 1 except that the heat treatment temperature was changed into 870° C.

Example 4: Preparation of Cathode Active Material

A cathode active material of LiNi$_{0.6}$Co$_{0.2}$Mn$_{0.2}$O$_2$ was synthesized according to the same method as Example 1 except that the heat treatment temperature was changed into 870° C.

Comparative Preparation Example 1: Preparation of Metal Hydroxide Precursor

A metal hydroxide precursor (Ni$_{0.6}$Co$_{0.2}$Mn$_{0.2}$(OH)$_2$) was obtained according to the same method as Preparation Example 1 except that a continuous reactor was used to grow metal hydroxide seeds up to a desired size slowly for 40 hours by adjusting a particle growth rate, and then, when the reaction was stabilized, the reactants overflown therefrom were collected and dried.

Comparative Preparation Example 2: Preparation of Metal Hydroxide Precursor

A metal hydroxide precursor (Ni$_{0.6}$Co$_{0.2}$Mn$_{0.2}$(OH)$_2$) was obtained according to the same method as Comparative Preparation Example 1 except that the metal hydroxide seeds were slowly growed up to a desired size for 80 hours.

Comparative Example 1: Preparation of Cathode Active Material

The metal hydroxide precursor (Ni$_{0.6}$Co$_{0.2}$Mn$_{0.2}$(OH)$_2$) according to Comparative Preparation Example 1 and lithium hydroxide (LiOH) having an average particle diameter of about 15 µm in a mole ratio of 1:1 were dry-mixed through milling at 2,000 rpm and then, heat-treated at about 870° C. in a firing furnace with a part of exhaust sections open under an air atmosphere for 15 hours. The primarily heat-treated product was secondarily heat-treated at about 500° C. with the exhausts close under an oxygen atmosphere for 6 hours to obtain cathode active material (LiNi$_{0.6}$Co$_{0.2}$Mn$_{0.2}$O$_2$) secondary particles.

Comparative Example 2: Preparation of Cathode Active Material

The metal hydroxide precursor (Ni$_{0.6}$Co$_{0.2}$Mn$_{0.2}$(OH)$_2$) according to Comparative Preparation Example 2 and lithium hydroxide (LiOH) having an average particle diameter of about 15 μm in a mole ratio of 1:1 were dry-mixed through milling at 2,000 rpm and then, heat-treated at about 880° C. in a firing furnace with a part of the exhausts open under an air atmosphere for 15 hours to obtain cathode active material ($LiNi_{0.6}Co_{0.2}Mn_{0.2}O_2$) secondary particles.

Evaluation of Pore Volume Fraction

Figure 3:
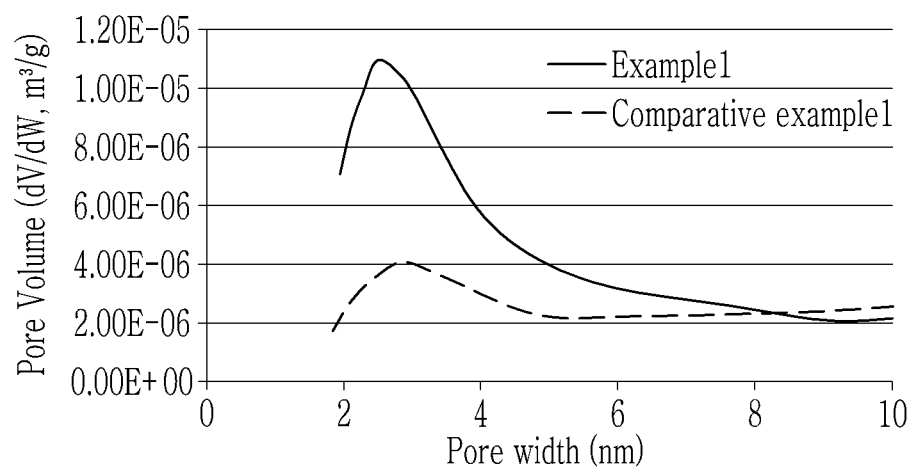
FIG. 3 is a graph showing measurement results of the pore volume fractions of the cathode active materials according to Example 1 and Comparative Example 1.

The cathode active materials Examples 1 to 4 and Comparative Examples 1 and 2 were measured with respect to pore volume fractions by using a surface area and porosity analyzer (ASAP 2020, Micromeritics Instrument Corp.) in a BJH Desorption method. Each cathode active material was pre-treated at 300° C. for 15 minutes under a nitrogen atmosphere before the measurement. The pore volume fractions of the cathode active materials of Example 1 and Comparative Example 1 depending on a pore size are shown in FIG. 3, and in the cathode active materials of Examples 1 and 2 and Comparative Examples 1 and 2, volume fractions of pores having a pore size of less than or equal to 10 nm based on the total pore volumes measured in the BJH desorption method are shown in Table 1.

TABLE 1

|  | Pore volume fraction |
| --- | --- |
| Example 1 | 12.9% |
| Example 2 | 15.1% |
| Comparative Example 1 | 7.5% |
| Comparative Example 2 | 6.4% |

Referring to Table 1, the cathode active materials according to Example 1 and 2 exhibited greater than or equal to 10% of a volume fraction of pores having a pore size of less than or equal to 10 nm, and the cathode active materials according to Comparative Examples 1 and 2 exhibited less than 10% of a volume fraction of pores having a pore size of less than or equal to 10 nm.

Example 5: Production of Coin-Cell 96 g of the cathode active material of $LiNi_{0.6}Co_{0.2}Mn_{0.2}O_2$ according to Example 1, 2 g of polyvinylidene fluoride, 137 g of N-methylpyrrolidone as a solvent, and 2 g of carbon black as a conductive agent were mixed, and the mixture was treated with a mixer to remove vapor to obtain uniformly-dispersed slurry for a cathode active material layer.

The slurry for a cathode active material layer was coated on an aluminum foil with a doctor blade to obtain a thin electrode plate and then, dried at 135° C. for greater than or equal to 3 hours, compressed, and vacuum-dried to produce a cathode.

The cathode and a lithium metal as a counter electrode were used to produce a coin half-cell. A separator formed of a porous polyethylene (PE) film (a thickness: about 16 μm) was disposed between the cathode and the lithium metal, and an electrolyte solution was injected thereinto to produce a coin cell. Herein, the electrolyte solution was prepared by mixing ethylenecarbonate (EC) and ethylmethylcarbonate (EMC) in a volume ratio of 3:5 and then, dissolving 1.1 M of $LiPF_6$ in the mixed solvent.

Example 6 and Comparative Examples 3 and 4: Production of Coin-Cells

Coin cells were produced according to the same method as Example 1 except that the cathode active materials of Example 2 and Comparative Examples 1 and 2 were used instead of the cathode active material of Example 1.

Cycle-life characteristics of the coin cells of Examples 5 and 6 and Comparative Examples 3 and 4 were evaluated as follows: first, the cells were first charged and discharged at 0.1 C to proceed to formation and then, once charged and discharged at 0.2 C to examine initial charge and discharge characteristics and subsequently, 50 times repetitively charged and discharged at 1 C to examine cycle characteristics. The charge was set to be started in a CC (constant current) mode and then, changed into a CV (constant voltage) mode and cut off at 4.3 V and 0.05 C, and the discharge was set to be cut off at 3.0 V in the CC (constant current) mode. The results are shown in FIG. 4.

Figure 4:
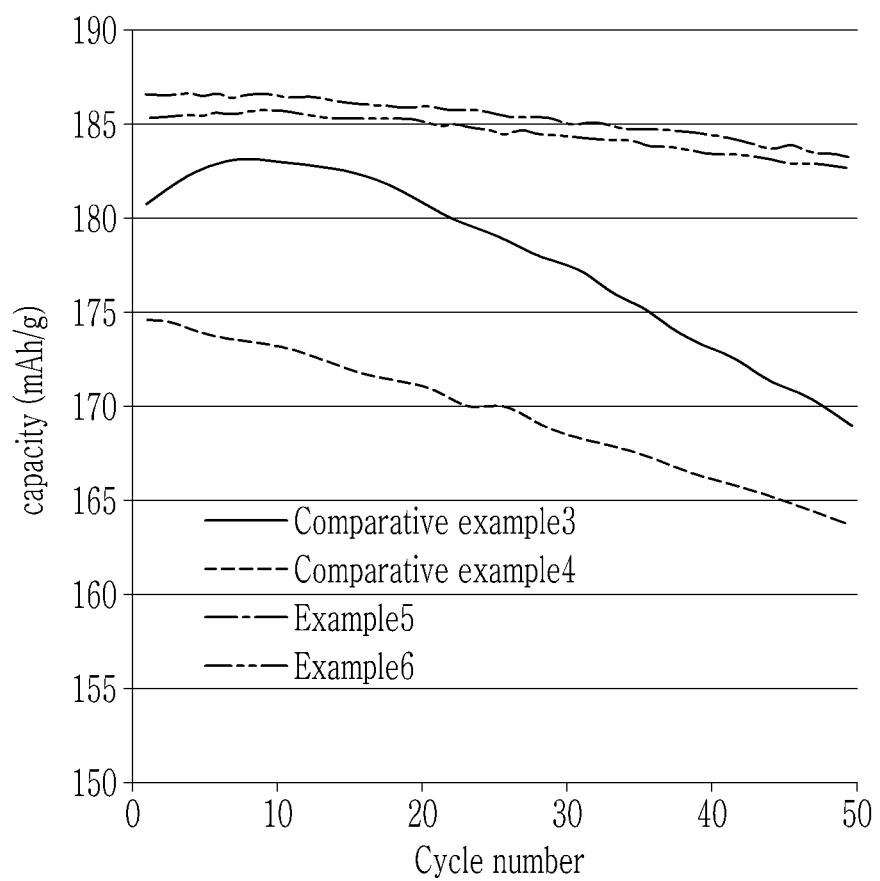
FIG. 4 is a graph showing measurement results of cycle-life characteristics for coin cells produced according to Example 5, Example 6, Comparative Example 3, and Comparative Example 4.

In the results of FIG. 4, the coin cells of Examples 5 and 6 exhibited improved cycle-life characteristics compared with the cells of Comparative Examples 3 and 4.

In the above, embodiments have been described with reference to the drawings and examples, but this is only exemplary, and those skilled in the art can understand that various modifications and other equivalent implementations are possible therefrom. Therefore, the protection scope of the present invention should be defined by the appended claims.

DESCRIPTION OF SYMBOLS

| 10: primary particle | 20: secondary particle |
| --- | --- |
| 31: lithium secondary battery | 32: anode |
| 33: cathode | 34: separator |
| 35: battery case | 36: cap assembly |

The invention claimed is:

1. A cathode active material for a lithium secondary battery, comprising:
   a secondary particle in which a plurality of primary particles are agglomerated,
   the secondary particle comprising a core and a surface portion, and having a predetermined arrangement structure in which (003) surfaces of primary particles of the plurality of primary particles are aligned to be in a vertical direction with respect to respective tangent lines at points (P) at which the (003) surfaces of the primary particles meet a surface of the secondary particle; and
   wherein the vertical direction in which the (003) surfaces of the primary particles are aligned is 90°±20° with respect to the respective tangent lines;
   wherein a pore volume fraction of micropores of less than or equal to 10 nm of the secondary particle is greater than or equal to 10% of a total pore volume, and the micropores of less than or equal to 10 nm are at the surface portion of the secondary particle; and
   wherein the secondary particle has an average pore size that decreases sequentially from an average pore size of the core to an average pore size of the surface portion.

2. The cathode active material of claim 1, wherein about 50% or more of the plurality of primary particles are arranged to be in the vertical direction with respect to their respective tangent lines at the points (P) at which (003) surfaces of the about 50% or more of the plurality of primary particles meet the surface of the secondary particle.

3. The cathode active material of claim 1, wherein an average length of the primary particles in a c-axis direction is in a range of 100 nm to 200 nm.

4. The cathode active material of claim 1, wherein a ratio of a length of a long side of one of the (003) surfaces and a length of a short side of the one of the (003) surfaces that is perpendicular to the long side is in a range of 2:1 to 10:1.

5. The cathode active material of claim 1, wherein the secondary particle has a radial array structure having one center or a multi-core radial array structure having a plurality of centers.

6. The cathode active material of claim 1, wherein the secondary particle has porosity that decreases sequentially from the core to the surface of the secondary particle.

7. A lithium secondary battery comprising:
a cathode comprising the cathode active material of claim 1;
an anode; and
an electrolyte therebetween.

8. The lithium secondary battery of claim 7, wherein about 50% or more of the plurality of primary particles are arranged to be in the vertical direction with respect to their respective tangent lines at the points (P) at which (003) surfaces of the about 50% or more of the plurality of primary particles meet the surface of the secondary particle.

9. The lithium secondary battery of claim 7, wherein an average length of the primary particles in a c-axis direction is in a range of 100 nm to 200 nm.

10. The lithium secondary battery of claim 7, wherein a ratio of a length of a long side of one of the (003) surfaces and a length of a short side of the one of the (003) surfaces that is perpendicular to the long side is in a range of 2:1 to 10:1.

11. The lithium secondary battery of claim 7, wherein the secondary particle has a radial array structure having one center or a multi-core radial array structure having a plurality of centers.

12. The lithium secondary battery of claim 7, wherein the secondary particle has a pore size that decreases sequentially from the core to the surface of the secondary particle.

13. The lithium secondary battery of claim 7, wherein the secondary particle has porosity that decreases sequentially from the core to the surface of the secondary particle.

14. The cathode active material of claim 1,
wherein a porosity of the core is 2% to 20%, and a porosity of the surface portion is 0.3% to 0.7%.

15. The cathode active material of claim 1,
wherein the average pore size of the core is 150 nm to 1 μm, and the average pore size of the surface portion is less than 150 nm.

* * * * *